United States Patent
Puttan et al.

(10) Patent No.: US 6,331,198 B1
(45) Date of Patent: Dec. 18, 2001

(54) COMPOSITION USEFUL AS NITRIFICATION INHIBITING ADDITIVE FOR AMMONIA PRODUCING FERTILIZERS

(75) Inventors: Krishnamurthy Puttan; Nadur Muddanna Nanje Gowda; Eranki Venkata Surya Prakasa Rao, all of Bangalore; Sushil Kumar, Lucknow, all of (IN)

(73) Assignee: Council of Scientific & Industrial Research, New Delmt (IN)

( * ) Notice: Subject to any disclaimer, the term of this patent is extended or adjusted under 35 U.S.C. 154(b) by 0 days.

(21) Appl. No.: 09/273,361

(22) Filed: Mar. 22, 1999

(30) Foreign Application Priority Data

Feb. 12, 1999 (IN) .......................................................... 232/99

(51) Int. Cl.$^7$ ................................ C05B 7/00; C05C 9/00
(52) U.S. Cl. ......................... 71/28; 71/34; 71/58; 71/61; 71/902; 71/DIG. 2
(58) Field of Search .................................. 71/27, 28, 34, 71/61, DIG. 2, 902, 58

(56) References Cited

U.S. PATENT DOCUMENTS

| | | | |
|---|---|---|---|
| 3,701,645 | * 10/1972 | Scott ........................................ | 71/1 |
| 4,576,626 | * 3/1986 | Bauer et al. ...................... | 71/DIG. 2 |
| 5,637,131 | * 6/1997 | Michel et al. ............................ | 71/28 |
| 5,951,736 | * 9/1999 | Grabarse et al. ........................ | 71/27 |

OTHER PUBLICATIONS

Chemical Abstracts citation 112:140518, May 1988.*
Chemical Abstracts citation 105:149872, 1986 (no month).*
Brundy and Bremner, "Inhibitation of Nitrification in Soils", Soil Sci, Soc, Amer. Proc., vol. 37, 1973, pp. 396–398 (no month).

McCarty and Bremner "Inhibitaion of Nitrification in Soil by Heterocyclic Nitrogen Compounds", Biology and Fertility of Soils Soils, 1989, pp. 204–211 (no month).

Puttanna and Rao, "Determination of Nitrate in Soil by Second Derivative Ultraviolet Spectrometry", Commun. Soil Sci. Plant Anal., 24(7 & 8), (1993), pp. 737–743 (no month).

Puttanna and Rao, "Modified Method of Nitrite Determination in Soils by Sulphanilic Acid/N–(1–Naphthyl) Ethylenediamine", Bank 149 –Heft 5, 1986, pp. 517–521 ( no month).

Prasad and Power, Nitrification Inhibitors for Agriculture, Health and the Environment, pp. 233,281 (no date).

Hinds and Lowe, "Application of the Berthelot Reaction to the Determinartion of Ammonium–N in Soil Extracts and Soil Digests", Commun. In Soil Science and Plant Analysis, 11(5), 1980, pp. 469–475 (no month).

* cited by examiner

*Primary Examiner*—Wayne Langel
(74) *Attorney, Agent, or Firm*—Sughrue, Mion, Zinn, Macpeak & Seas, PLLC

(57) ABSTRACT

The invention provides a synergistic composition useful as a nitrification inhibiting additive for ammonium producing fertilizers which comprises:

(a) benzotriazole in the range of 2.5 to 50% (by wt % of the ammonium fertilizer), (b) metal chelating agent (cooper/nickel in the range from about 1 to 50% (by wt % of the ammonium) and ion binding compound and precursors and fertilizer.

9 Claims, No Drawings

COMPOSITION USEFUL AS NITRIFICATION INHIBITING ADDITIVE FOR AMMONIA PRODUCING FERTILIZERS

FIELD OF INVENTION

Chemical fertilizers are essential for obtaining high yields in agriculture. Nitrogen fertilizers like urea show low efficiencies when applied to field crops and contribute to environmental pollution. One such nitrification inhibitor, benzotriazole showed increased efficiency when combined with metal ion chelating compounds.

BACKGROUND OF INVENTION

Nitrification inhibitors are useful in reducing nitrogen fertilizer requirement, improving crop yields and quality, reducing nitrogen losses, minimizing environmental pollution and increasing fertilizer use efficiency (Prasad, R. and Power, J. R. 1995. Nitrification inhibitors in agriculture, health and environment. Advances in Agronomy 54: 233–281). Benzotriazole was one of the heterocyclic compounds shown to inhibit nitrification of $(NH_4)_2SO_4$ in soils. (Mc Carty, G. W. and Bremner, J. M. 1989. Inhibition of nitrification in soil by heterocyclic compounds Biol. Fertil. Soil, 8(3), 204, 1989). Benzotriazole was shown to inhibit nitrification to different extents depending on its concentration and the soil, thus showing its variable potency depending on the soil. Since benzotriazole is known to form complexes with a number of metal ions the variable potency may be due to the variations in metal ion availability in these soils. High metal ion concentrations in soil solution may render benzotriazole ineffective as a nitrification inhibitor. No method is available for overcoming the difficulty.

OBJECTS OF THE INVENTION

The main objective of the invention is to provide a synergistic composition useful as a nitrification inhibiting additive for ammonia producing fertilizers.

Another objective of the present invention is to provide metal ion chelating agent for maximizing the potency of benzotriazole as a nitrification inhibitor in soils regardless of the metal ion concentrations present in the latter.

SUMMARY OF THE INVENTION

This invention provides a synergistic composition of metal ion chelating agents added to benzotriazole in the proportion 1:2. These agents though do not possess nitrification inhibitory properties, enhance the ability of benzotriazole greatly to inhibit nitrification in soils irrespective of metal ion concentrations in soil solutions.

DETAILED DESCRIPTION OF THE INVENTION

Nitrification inhibitors are useful for amending nitrogen fertilizers to improve crop yields, reduce N losses, to increase fertilizer use efficiency, to reduce nitrate content in food and sometimes to improve quality of agricultural produce. A number of hetrocyclic compounds, including benzotriazole were recently shown to inhibit nitrification in soils. The potency of benzotriazole varied from soil to soil. The applicants have found that certain organic compounds which are known to bind metal ions as chelates synergistically increase the potency of benzotriazole. Whereas, these compounds do not inhibit nitrification by themselves. A mixture of one or more of these compounds with benzotriazole is, therefore, a superior nitrification inhibiting additive for ammonia producing fertilizers than either benzotriazole or a chelating agent separately. The chelating agents prevent deactivation of benzotriazole by reaction of the latter with metal ions present in the soil to form insoluble precipitates.

Accordingly, the present invention provides a synergistic composition useful as nitrification inhibiting additive for ammonia producing fertilizers which comprises benzotriazole (2.5% to 50% by wt % of the ammonium fertilizer) and metal ion chelating agent (1% to 50% by wt % of the ammonium fertilizer).

In an embodiment of the present invention, the metal ion chelating agent may be selected from salicylaldoxime, ethylene diamine, dimethyl glyoxime, cupferron, thiourea, 1-nitroso-2-naphthol, acetyl acetone or any copper and/or nickel ion binding compounds or their precursors or mixtures thereof.

In another embodiment of the present invention, the synergistic composition may be added to, coated on mixed with, blended with or incorporated into urea, ammonium salt or any other ammonium producing fertilizers.

In yet another embodiment of the invention, the product may be optionally used after changing the physical form as a soil applied fertilizer or using the said composition for soil application before, with or after the application of the nitrogen fertilizer for inhibiting nitrification.

Benzotriazole at 2.5 to 50% by weight of urea or ammonium salts and 1.0 to 50% salicylaldoxime, ethylene diamine, dimethyl glyoxime, cupferron, thiourea, 1-nitroso-2-naphthol, acetyl acetone, mixtures of these and/or their precursors, etc., are added to ammonium producing fertilizer and mixed, coated or blended to produce a fertilizer which can be applied to soils. The fertilizer may optionally be converted to a briquette, supergranule etc., before applying. Benzotriazole and the chelating agents may also be applied separately before, during or after the application of the fertilizer. Other compounds such as urease inhibitors may also be included in the fertilizer. Nitrification of fertilizer nitrogen will be retarded more than it would when only benzotriazole is added.

Benzotriazole reacts with most of the metal ions to produce insoluble compounds and thus loses, to varying degrees depending on the ion and its concentration, its ability to inhibit nitrification. The concentration of different metal ions or their availability in soil varies from soil to soil and thus influences the extent to which nitrification is inhibited by benzotriazole. The chelating agents, which have a low affinity for the generally abundant calcium ions in soil but high affinity for transition metal ions such as copper and nickel bind the transition metal ions so that benzotriazole is not precipitated or otherwise inactivated but remains free and effective. This in turn increases the fertilizer use efficiency.

The following examples are given by way of illustration of the present invention and should not be construed to limit the scope of the present invention.

EXAMPLE 1

The formulation consists of benzotriazole and chelating agent chosen from salicylaldoxime, dimethylglyoxime, cupferron or thiourea in 1:2 proportion. The formulations were added to urea to give a benzotriazole concentration equal to 10% of N and were tested as follows:

To 50 g of a <2 mm air dry sandy loam soil in a 100 ml conical flask aqueous solutions of urea and benzotriazole were added to obtain 100 g urea-N and 5 g benzotriazole g$^{-1}$ soil. An aqueous solution or a fine dispersion in finely ground soil of a metal ion chelating agent mentioned above was added to obtain 10 g chelating agent/g soil. Triplicate sets of flasks were prepared in this way and appropriate blanks were included. The flasks were incubated at 30 C. and 100% relative humidity for 45 days after adjusting the moisture content to 60% of the maximum water holding capacity of the soil by adding the calculated quantities of distilled water. Sub samples were withdrawn at 15 day intervals and analyzed for ammonium, nitrite and nitrate by phenol hypochlorite (Hinds, A. A. and Lowe, L. E. 1980. Application of Berthlot reaction to the determination of ammonium N in soil extracts and soil digests. *Commun. Soil Sci. Plant Anal.* 11:469–475) sulphanilic acid/N-(1-naphthyl ethylene diamine (Puttanna, K. and Prakasa Rao E. V. S. 1986 Modified method of nitrite determination in soils by sulphanilic acid/N-(1-naphthyl) ethylene diamine *Z. Pflanzenernaehr. Bodenk.* 149:517–521) and second derivative UV (Puttanna, K and Prakasa Rao, E. V. S. 1993 Determination of nitrate in soil by second derivative ultraviolet spectrometry. *Commun. Soil Sci. Plant Anal.* 24:737–743.) methods, respectively. The percentage of inhibition of nitrification was calculated as $$\% \text{ Inhibition} = \frac{(\text{Nitrate} + \text{nitrite produced in the absence of inhibitor}) - (\text{nitrate} + \text{nitrite produced in the presence of the inhibitor})}{(\text{nitrate} + \text{nitrite produced in the absence of inhibitor})} \times 100$$

(Bundy, L. G. and Bremner, J. M. 1973. Inhibition of nitrification in soils. *Soil Sci. Soc. Am. Proc.* 37, 396–398).

Table 1 shows the results for these chelating agents.

TABLE 1

Effect of treatments on the mineral forms of N in soils at 15 days

| Treatment | NH$^+_4$-N | NO$^-_2$-N | NO$^-_3$-N |
|---|---|---|---|
| Urea | 9.8 | 0.0 | 86.0 |
| Urea + benzotriazole | 73.2 | 0.0 | 22.5 |
| Urea + salicylaldoxime | 8.6 | 2.3 | 84.0 |
| Urea + benzotriazole + salicylaldoxime | 101.4 | 0.0 | 0.1 |
| Urea + dimethylglyoxime | 10.1 | 0.0 | 87.9 |
| Urea + benzotriazole + dimethylglyoxime | 83.7 | 0.0 | 7.6 |
| Urea + Cupferron | 10.5 | 0.0 | 86.5 |
| Urea + benzotriazole + cupferon | 79.3 | 0.0 | 7.6 |
| Urea + thiourea | 8.7 | 0.0 | 88.3 |
| Urea + benzotriazole + thiourea | 83.2 | 0.0 | 6.2 |

EXAMPLE 2

The formulation consisted of benzotriazole and a chelating agent chosen from ethylenediamine, 1-nitroso-2-naphthol, acetyl acetone or mixtures thereof in 1:2 proportions. The formulations were added to urea to give a benzotriazole concentration equal to 10% of N and were tested as in the above example. EDTA and glycine were also tested in the same way. The results are summarized in Table 2.

TABLE 2

Effect of treatments on mineral forms of N in soils at 15 days

| Treatment | NH$^+_4$-N | NO$^-_2$-N | NO$^-_3$-N |
|---|---|---|---|
| Urea | 9.8 | 0.0 | 86.0 |
| Urea + benzotriazole | 73.2 | 0.0 | 22.5 |
| Urea + ethylenediamine | 7.9 | 0.0 | 89.3 |
| Urea + benzotriazole + ethylenediamine | 79.5 | 0.0 | 18.9 |
| Urea + 1-nitroso-2-naphthol | 9.0 | 0.1 | 82.7 |
| Urea + benzotriazole + 1-nitroso-2-naphthol | 60.5 | 0.1 | 14.8 |
| Urea + acetyl acetone | 8.2 | 2.1 | 87.3 |
| Urea + benzotriazole + acetylacetone | 67.4 | 0.0 | 20.6 |
| Urea + EDTA | 8.9 | 0.0 | 86.1 |
| Urea + benzotriazole + EDTA | 7.8 | 0.0 | 87.8 |
| Urea + glycine | 5.7 | 0.0 | 89.1 |
| Urea + benzotriazole + glycine | 0.3 | 0.0 | 90.4 |

EXAMPLE 3

The formulation consists of benzotriazole and thiourea in the ratio 1:4. The formulation was tested as in the above examples and the results are given in Table 3.

TABLE 3

Effect of thiourea on the mineral forms of N produced in soil from benzotriazole treated urea at 15 days (Benzotriazole:thiourea = 1:4)

| Treatment | NH$^+_4$-N | NO$^-_2$-N | NO$^-_3$-N |
|---|---|---|---|
| Urea | 9.8 | 0.0 | 86.0 |
| Urea + benzotriazole (5 g/g) | 73.2 | 0.0 | 22.5 |
| Urea + benzotriazole (2.5 g/g) | 10.4 | 0.0 | 84.5 |
| Urea + benzotriazole (2.5 g/g) + thiourea (10 g/g) | 15.5 | 0.0 | 79.6 |

These examples show that though EDTA and glycine failed to affect the efficacy of benzotriazole, the other compounds improved the potency of benzotriazole as a nitrification inhibitor. The present inhibition values are presented in Table 4.

TABLE 4

Effect of 10 ppm chelating agents on the nitrification inhibition by 5 ppm benzotriazole in a sandy loam soil.

| Chelating agent | % Nitrification inhibition in the presence of benzotriazole |
|---|---|
| Salicylaldoxime | 99.9 |
| Thiourea | 92.8 |
| Dimethylglyoxime | 91.2 |
| Cupferron | 91.2 |
| 1-Nitroso-2-naphthol | 82.7 |
| Ethylenediamine | 78.0 |
| Acetylacetone | 76.0 |
| Nil | 73.8 |

Without benzotriazole, these compounds did not inhibit nitrification. This shows that inhibition of nitrification by benzotriazole was greatly enhanced when a chelating agent is also present signifying the synergistic actions of the composition.

The compositions prepared are not mere admixtures but synergistic mixtures in which the aggregate property of the compositions are different from the properties of individual ingredients.

The main advantages of the present invention are:
1. Better inhibition of nitrification can be achieved which reduces nitrogen losses and economises N use.
2. Lower concentrations of benzotriazole can be used.

What is claimed is:

1. An agriculturally-effective fertilizer comprising an ammonium-producing fertilizer and a synergistically-effective nitrification-inhibiting additive, the additive comprising:
   (a) 2.5 to 50% benzotiazole by wt % of the ammonium-producing fertilizer and
   (b) 1 to 50% chelating agent by wt % of the ammonium-producing fertilizer,
      wherein the combination of the benzotriazole and the chelating agent provides the synergistic activity of the additive.

2. The agriculturally-effective fertilizer of claim 1, wherein the ammonium-producing fertilizer is selected from the group consisting of urea, ammonium salt and thiourea.

3. The agriculturally-effective fertilizer of claim 1, wherein the fertilizer is formed into briquettes or supergranules.

4. The agriculturally-effective fertilizer of claim 1, further comprising one or more urease inhibitors.

5. The agriculturally-effective fertilizer of claim 1, wherein the chelating agent is selected from the group consisting of a copper-chelating agent, a nickel-chelating agent, salicylaldoxime, ethylenediamine, dimethylglyoxime, cupferron, thiourea, 1-nitroso-2-naphthol, acetyl acetone, their precursors and mixtures thereof.

6. A synergistically-effective nitrification-inhibiting additive which comprises a 20:1 to 1:50 ratio by weight of chelating agent to benzotriazole, wherein the combination of the benzotriazole and the chelating agent provides the synergistic activity of the additive to inhibit nitrification.

7. The additive of claim 1, wherein the chelating agent is selected from the group consisting of a copper-chelating agent, a nickel-chelating agent, salicylaldoxime, ethylenediamine, dimethylglyoxime, cupferron, thiourea, 1-nitroso-2-naphthol, acetyl acetone, their precursors and mixtures thereof.

8. A method of inhibiting the nitrification of an ammonium-producing fertilizer comprising, applying the synergistically-effective nitrification-inhibiting additive of claim 1 to the soil surrounding crop plants, and applying an ammonium-producing fertilizer to the same.

9. The method of claim 8, herein the synergistically-effective nitrification-inhibiting additive of claim 1 is added to the soil surrounding crop plants prior to, concurrently with, or subsequent to the addition of an ammonium-producing fertilizer to the same.

* * * * *

UNITED STATES PATENT AND TRADEMARK OFFICE
CERTIFICATE OF CORRECTION

PATENT NO.     : 6,331,198 B1
DATED          : December 18, 2001
INVENTOR(S)    : Krishnamurthy Puttanna, Nadur Muddanna Nanje Gowda,
                 Eranki Vankata Surya Prakasa Rao and Sushil Kumar It is certified that error appears in the above-identified patent and that said Letters Patent is hereby corrected as shown below:

<u>Title page,</u>
Item [75], Inventors section, change "Krishnamurthy PUTTAN" to
-- Krishnamurthy PUTTANNA -- ; and Item [73], Assignee section, change "New Delmt (IN)" to -- New Delhi (IN) --.

Signed and Sealed this

Twenty-fifth Day of June, 2002

Attest:

Attesting Officer

JAMES E. ROGAN
*Director of the United States Patent and Trademark Office*